United States Patent [19]
Fujinami et al.

[11] Patent Number: 6,112,012
[45] Date of Patent: *Aug. 29, 2000

[54] RECORDING MULTIPLEXED PLURAL DATA ENCODED BY PLURAL METHODS AND DECODING SAME ACCORDING TO PARTICULAR DECODING METHOD

[75] Inventors: Yasushi Fujinami; Makoto Kawamura, both of Kanagawa, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/690,808

[22] Filed: Aug. 1, 1996

[30] Foreign Application Priority Data

Aug. 2, 1995 [JP] Japan .................................. 7-197815

[51] Int. Cl.[7] .................................................. H04N 5/928
[52] U.S. Cl. .............................. 386/99; 386/109; 386/104
[58] Field of Search ................................ 386/109, 95, 96, 386/98, 102, 104, 111, 112, 92, 27, 33, 39, 99, 101; 360/32; H04N 5/928

[56] References Cited

U.S. PATENT DOCUMENTS

| | | |
|---|---|---|
| 4,661,946 | 4/1987 | Takahashi et al. . |
| 5,117,500 | 5/1992 | Davis et al. . |
| 5,130,816 | 7/1992 | Yoshio ...................................... 386/99 |
| 5,172,393 | 12/1992 | Hessler et al. . |
| 5,396,374 | 3/1995 | Kubota et al. .............................. 386/96 |
| 5,481,370 | 1/1996 | Kim ........................................... 386/96 |
| 5,513,010 | 4/1996 | Kori et al. ................................ 386/104 |
| 5,636,186 | 6/1997 | Yamamoto et al. ......................... 369/4 |
| 5,694,334 | 12/1997 | Donahue et al. .................... 364/514 R |

FOREIGN PATENT DOCUMENTS

| | | |
|---|---|---|
| 0 550 843 | 7/1993 | European Pat. Off. . |
| 2 225 516 | 5/1990 | United Kingdom . |

OTHER PUBLICATIONS

Patent Abstracts of Japan, vol. 18, No. 419, (E–1589), Aug. 5, 1994 of JP 06 125539 A (Nippon Telegr & Teleph Corp), May 6, 1994.

Rault J. B. et al.: "The ISO/MPEG Audio Musicam Family" IEE Colloquium On MPEG What It Is And What It Isn't, No. 12, Jan. 1, 1995, pp. 3/1–3/14, XP000571800.

Noll P: "Digital Audio Coding For Visual Communications", Proceedings of the IEEE, Jun. 1995, USA, vol. 83, No. 6, ISSN 0018–9219, pp. 925–943, XP000518744.

*Primary Examiner*—Robert Chevalier
*Attorney, Agent, or Firm*—Frommer Lawrence & Haug, LLP.; William S. Frommer; Dennis M. Smid

[57] ABSTRACT

Encoding and decoding methods and apparatuses for storing and retrieving multi-channel data each encoded according to a different encoding method and stored in a multiplexed form utilize group information identifying each multi-channel data as belonging to a particular group.

43 Claims, 9 Drawing Sheets

| Syntax | No. of bits | Mnemonic |
|---|---|---|
| directory_PES_packet() { | | |
|     packet_start_code_prefix | 24 | bslbf |
|     directory_stream_id | 8 | uimsbf |
|     PES_packet_length | 16 | uimsbf |
|     number_of_access_units | 15 | uimsbf |
|     marker_bit | 1 | bslbf |
|     prev_directory_offset[44..30] | 15 | uimsbf |
|     marker_bit | 1 | bslbf |
|     prev_directory_offset[29..15] | 15 | uimsbf |
|     marker_bit | 1 | bslbf |
|     prev_directory_offset[14..0] | 15 | uimsbf |
|     marker_bit | 1 | bslbf |
|     next_directory_offset[44..30] | 15 | uimsbf |
|     marker_bit | 1 | bslbf |
|     next_directory_offset[29..15] | 15 | uimsbf |
|     marker_bit | 1 | bslbf |
|     next_directory_offset[14..0] | 15 | uimsbf |
|     marker_bit | 1 | bslbf |
|     for(i=0; i<number_of_access_units;i++) { | | |
|         packet_stream_id | 8 | uimsbf |
|         PES_header_position_offset_sign | 1 | tcimsbf |
|         PES_header_position_offset[43..30] | 14 | uimsbf |
|         marker_bit | 1 | bslbf |
|         PES_header_position_offset[29..15] | 15 | uimsbf |
|         marker_bit | 1 | bslbf |
|         PES_header_position_offset[14..0] | 15 | uimsbf |
|         marker_bit | 1 | bslbf |
|         reference_offset | 16 | uimsbf |
|         marker_bit | 1 | bslbf |
|         reserved | 3 | bslbf |
|         PTS[32..30] | 3 | uimsbf |
|         marker_bit | 1 | bslbf |
|         PTS[29..15] | 15 | uimsbf |
|         marker_bit | 1 | bslbf |
|         PTS[14..0] | 15 | uimsbf |
|         marker_bit | 1 | bslbf |
|         bytes_to_read[22..8] | 15 | uimsbf |
|         marker_bit | 1 | bslbf |
|         bytes_to_read[7..0] | 8 | uimsbf |
|         marker_bit | 1 | bslbf |
|         intra_coded_indicator | 1 | bslbf |
|         coding_parameters_indicator | 2 | bslbf |
|         reserved | 4 | bslbf |
|     } | | |
| } | | |

FIG.4

| Syntax | No. of Bits | Mnemonic |
|---|---|---|
| program_stream_map(){ | | |
|     packet_start_code_prefix | 24 | bslbf |
|     map_stream_id | 8 | uimsbf |
|     program_stream_map_length | 16 | uimsbf |
|     current_next_indicator | 1 | bslbf |
|     reserved | 2 | bslbf |
|     program_stream_map_version | 5 | uimsbf |
|     reserved | 7 | bslbf |
|     marker_bit | 1 | bslbf |
|     program_stream_info_length | 16 | uimsbf |
|     for (i=0;i<N;i++){ | | |
|         descriptor() | | |
|     } | | |
|     elementary_stream_map_length | 16 | uimsbf |
|     for (i=0;i<N1;i++){ | | |
|         stream_type | 8 | uimsbf |
|         elementary_stream_id | 8 | uimsbf |
|         elementary_stream_info_length | 16 | uimsbf |
|         for (i=0;i<N2;i++){ | | |
|             descriptor() | | |
|         } | | |
|     } | | |
|     CRC_32 | 32 | rpchof |
| } | | |

B: program_stream_info_length ... elementary_stream_map_length region
C: elementary_stream_info_length ... descriptor() region

FIG.5

| Descriptor | Type | Tag |
|---|---|---|
| path_descriptor() | DVD defined | 0xf0 |
| program_descriptor () | DVD defined | 0xef |
| stream_grouping_descriptor () | DVD defined | 0xed |
| copy_control_descriptor () | DVD defined | 0xec |
| padding_descriptor () | DVD defined | 0xeb |
| layer_jump_descriptor () | Not yet defined | 0xea |
| dvd_private_stream_descriptor () | DVD defined | 0xe9 |
| dvd_video_descriptor () | DVD defined | 0xdf |
| dvd_audio_descriptor () | DVD defined | 0xdd |
| dvd_subtitle_descriptor () | DVD defined | 0xdc |
| dvd_lpcm_descriptor () | DVD defined | 0xdb |
| ISO_639_Language_descriptor () | MPEG defined | 0x0a |
| ip_ipp_descriptor () | DVD defined | 0xda |
| copyright_descriptor () | MPEG defined | 0x0d |
| video_special_coding_descriptor () | Not yet defined | 0xd8 |

FIG.6

| Syntax | No. of bits Bits | Mnemonic |
|---|---|---|
| stream_grouping_descriptor ()<br>{<br>    descriptor_tag | 8 | uimsbf |
|     descriptor_length | 8 | uimsbf |
|     num_of_groups | 8 | uimsbf |
|     for (i=0;i< num_of_groups;i++){<br>        num_of_streams_in_group | 8 | uimsbf |
|         for(j=0;j< num_of_streams_in_group;j++){<br>            stream_type | 3 | uimsbf |
|             stream_id | 5 | uimsbf |
|             if (stream_type==MULTILINGUAL_COMPRESSED_AUDIO){<br>                num_language_channels_in_group | 4 | uimsbf |
|                 for (k=0;k<num_language_channels_in_group;k++){<br>                      language_channel | 4 | uimsbf |
|                 }<br>            }<br>        }<br>    }<br>    stuffing | 0-12 | bslbf |
| } | | |

FIG.7

| Code | Description |
|---|---|
| 000 | Program Stream |
| 001 | Video |
| 010 | Single language compressed audio |
| 011 | Multilingual compressed audio |
| 100 | LPCM |
| 101 | Subtitle |
| 110 | Reserved |
| 111 | Reserved |

FIG.8

RECORDING MULTIPLEXED PLURAL DATA ENCODED BY PLURAL METHODS AND DECODING SAME ACCORDING TO PARTICULAR DECODING METHOD

BACKGROUND OF THE INVENTION

The present invention relates to the field of video data compression, audio data compression, and recording time-division multiplexed data.

It has been contemplated that video data and audio data compressed according to the MPEG video standard (ISO/IEC 13818-2) may be recorded on a recording medium according to the MPEG system standard (ISO/IEC 13818-1). Pursuant to the MPEG system standard, streams of video data and audio data are divided into packets to form a packetized elementary stream (PES) of a predetermined unit length. Synchronization data, such as a presentation time stamp (PTS) or a system clock reference (SCR), is appended to a packetized elementary stream prior to recording of the stream. In decoding the recorded stream, a decoder adjusts the decoding operation according to the PTS and SCR to assure correct synchronization between the reproduced video data and the reproduced audio data.

Many types of data are compatible with the MPEG system standard. The MPEG audio standard (ISO/IEC 11172-3) and ordinary linear PCM may be utilized for encoding audio data. Consequently, an audio/video signal may include video data encoded according to MPEG video standard (ISO/IEC 13818-2) and audio data encoded by linear PCM. However, such an audio/video signal cannot be reproduced accurately by a reproduction system that is not compatible with linear PCM. Even a reproduction system compatible with the MPEG audio standard (ISO/IEC 11172-3), but not specifically compatible with linear PCM, does not accurately reproduce audio data encoded by linear PCM.

OBJECTS AND SUMMARY OF THE INVENTION

Therefore, an object of the present invention is to provide an encoding and recording system for encoding and recording multiple channels of similar or identical data according to different encoding formats.

Another object of the present invention is to record data encoded according to plural encoding methods such that a decoding system adapted to decode data according to only particular encoding methods may selectively decode data encoded according to those particular encoding methods.

According to an aspect of the present invention a data encoding apparatus multiplexes data strings packetized from multi-channel data into packets of pre-set length. A group information generating device generates group information which defines multi-channel data having the same or same type of contents, but encoded by a different encoding method or system, as data of the same group. A multiplexing device multiplexes the multi-channel data with the group information. By encoding data in this manner, a data reproducing and decoding device may select and decode multiplexed data based upon the group information.

According to another aspect of the present invention, a data recording medium recorded according to the methods of the present invention has recorded thereupon data strings, obtained by packetizing multi-channel data into packets of pre-set length, along with group information defining multi-channel data having the same or same type of contents, but encoded by a different encoding method or system, as data of the same group.

According to still another aspect of the present invention, a data decoding apparatus includes a group information detection device for detecting group information, a selection device for selecting each channel of data based upon the group information detected, and a decoding device for decoding each channel of data selected by the selection device.

According to yet another aspect of the present invention, a data encoding apparatus is provided which includes a receiving device for receiving multi-channel data each encoded according to a different encoding method, a group information generating device for generating a group information identifying each of the multi-channel data as belonging to a particular group, and a multiplexing device for multiplexing the multi-channel data with the group information to produce a multiplexed data.

According to another aspect of the present invention, a recording medium for use in conjunction with a processor-controlled apparatus is provided. The recording medium has a plurality of coded data recorded thereupon and has a group information recorded thereupon. The group information includes at least an information identifying each of the coded data as belonging to a particular group, thereby enabling the processor-controlled apparatus to reproduce from the recording medium group data by using the group information to select the group data from the coded data.

According to still another aspect of the present invention, a decoding apparatus is provided which includes a receiving device for receiving a multiplexed data comprised of a multi-channel data each encoded according to a different encoding method and of a group information data identifying each of the multi-channel data as belonging to a particular group, a group information detection device for detecting the group information; and a demultiplexing device, coupled to the group information detection device, for demultiplexing the multiplexed data to isolate the multi-channel data.

Other objects, features, and advantages according to the present invention will become apparent from the following detailed description of illustrated embodiments when read in conjunction with the accompanying drawings in which the same components are identified by the same reference numerals.

BRIEF DESCRIPTION OF THE DRAWINGS

FIG. 4 is a format diagram for a program_stream_directory area;

FIG. 5 is a format diagram for a program_stream_map area;

FIG. 6 is a chart of sample descriptor areas;

FIG. 7 is a format diagram for a stream_grouping_descriptor area;

FIG. 8 is a format diagram for a stream_type area; and

DETAILED DESCRIPTION OF THE PREFERRED EMBODIMENTS

Figure 1:
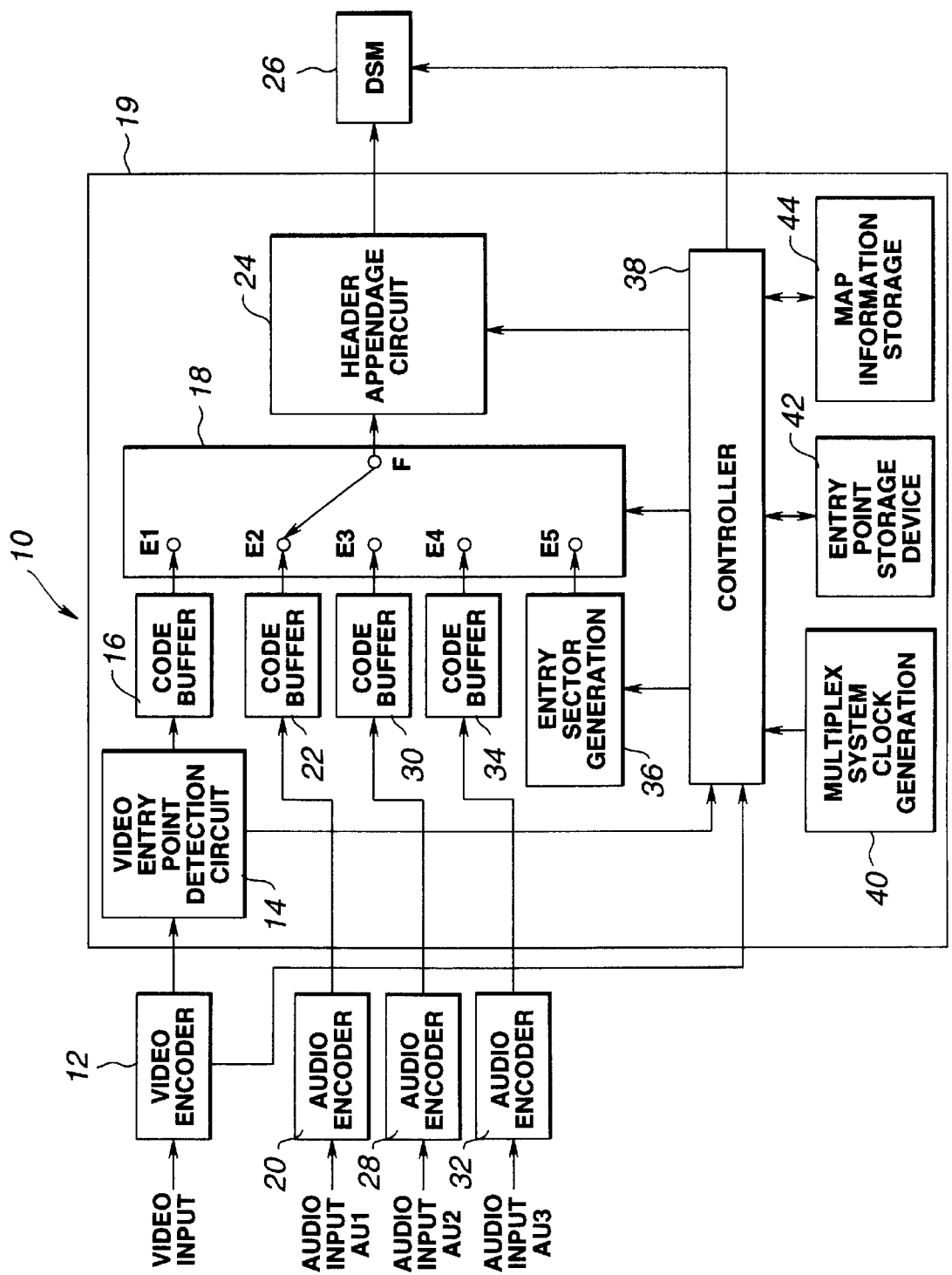
FIG. 1 is a block diagram of an encoding apparatus.

FIG. 1 illustrates an embodiment of a data encoding apparatus 10 according to the present invention. Data encoding apparatus 10 includes a video encoder 12; a multiplexer 19; audio encoders 20, 28, and 32; and a storage medium 26. Multiplexer 19 includes a video entry point detection circuit 14; code buffers 16, 22, 30, and 34; a switching circuit 18; a header appending circuit 24; an entry sector generator 36; a controller 38; a multiplex system clock generator 40, an entry point storage device 42, and a MAP information storage device 44.

Video encoder 12 encodes video input signals for compression and supplies encoded video signals to video entry point detection circuit 14. Optionally, video encoder 12 generates an entry point signal for supply to controller 38 indicating each intra-coded picture (I-picture) which is produced by video encoder 12.

Audio encoders 20, 28, and 32 encode and packetize audio data into packets of data. Storage medium 26 is a storage device and is preferably comprised of a digital storage medium, such as a semiconductor memory, a magnetic disc, a magnetic tape, an optical disk, or the like.

If video encoder 12 does not generate an entry point signal or if a pre-encoded video bitstream is supplied as video input, video entry point detection circuit 14 detects the occurrence of entry points, such as I-pictures, in the encoded video signals and generates an entry point signal indicating the occurrence of each entry point. The encoded video signals are passed by video entry point detection circuit 14 to code buffer 16. As shown, audio encoders 20, 28, and 32 supply encoded packetized data to code buffers 22, 30, and 34, respectively.

Entry sector generator 36 is responsive to control signals from controller 38. The output of entry sector generator 36 is coupled to input terminal E5 of switching circuit 18. Multiplex system clock generator 40 generates a system clock signal which is supplied to controller 38. In accordance with the system clock signal, controller 38 controls switching circuit 18 to sequentially periodically couple input terminals E1, E2, E3, E4, and E5 to output terminal F. As switching circuit 18 switches from one input terminal to another, data is retrieved, in turn, from each of code buffers 16, 22, 30, and 34 and entry sector generator 36 to produce a time-division multiplexed bitstream which is supplied to header appending circuit 24.

Controller 38 controls header appending circuit 24 to append a video packet header to video data in the multiplexed bitstream and to append an audio packet header to audio data in the multiplexed bitstream.

In response to the entry point signal supplied by video encoder 12 or by video entry point detection circuit 14, controller 38 controls entry sector generator 36 to generate an entry sector for insertion at predetermined positions within the multiplexed bitstream.

Entry point storage device 42 is a memory device coupled to controller 38. Entry point storage device 42 stores entry point position information supplied by controller 38 for later retrieval. Controller 38 supplies entry point position information to storage device 42 in accordance with the entry point signal.

MAP information storage device 44 is another memory device coupled to controller 38. MAP information storage device 44 stores information received from an external input device. Controller 38 controls MAP information storage device 44 to supply stored information to controller 38 when such information constitutes entry sector information. Controller 38 supplies the entry sector information to header appending circuit 24 for storage in an entry sector. If the entry sector information regards an entry sector other than the current entry sector, the position of the entry sector is retrieved from entry point storage device 42.

Code buffers 16, 22, 30, and 34 are conventional storage devices such as a semiconductor memory device. Switching circuit 18 is a controlled switch for coupling input terminals E1, E2, E3, E4, and E5 with output terminal F. Header appending circuit 24 appends header areas and/or header information to packets, packs, sectors, etc. in a multiplexed stream of data. Controller 38 is preferably a CPU, such as a microprocessor, but may comprise any semiconductor controller device or like controller device.

Optionally, data encoding apparatus 10 produces a multiplexed bitstream which includes at least one pack and an ISO_11172_end code.

In operation, controller 38 receives an entry point signal from video encoder 12 or video entry point detection circuit 14 and controls apparatus 10 to insert an entry sector immediately before the video entry point. Controller 38 controls entry sector generator 36 to generate an entry packet and controls switching circuit 18 to couple input terminal E5 with output terminal F. Header appending circuit 24 receives the entry packet included in the entry sector, and multiplexes it with video data and audio data received through switching circuit 18 from code buffers 16, 22, 30, and 34. The video data and each elementary stream of audio data in each channel are recorded after the groups of the elementary streams having the same or same type of contents are defined in information recorded in a stream_grouping_descriptor area in a program_stream_map area and the elementary stream types are defined by information recorded in a stream_type area.

As an example, if audio input signals AU1 and AU2 are linear PCM audio signals and are compressed audio signals having the same or same type of contents but encoded according to different methods, then audio input signals AU1 and AU2 are recorded after a stream_grouping_descriptor area is recorded with information indicating that signals AU1 and AU2 belong to the same group.

Since a group of elementary streams having the same or same type of contents has been defined, a reproduction system which is not adapted for reproduction of the information in an elementary stream of the group may skip that elementary stream and search for another elementary stream in the group which can be reproduced.

Figure 2:
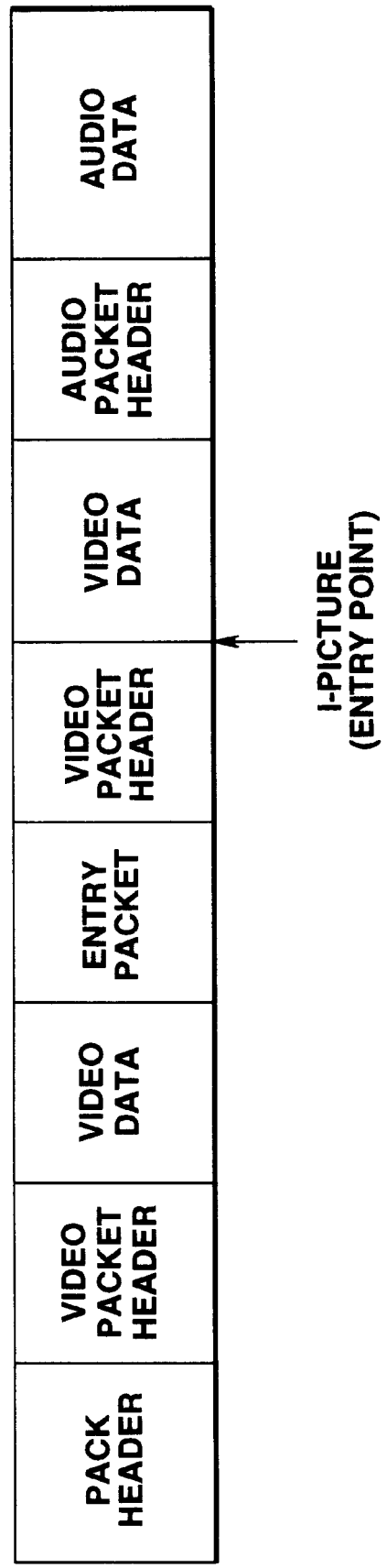
FIG. 2 is a format diagram for a pack area.

FIG. 2 illustrates a sample pack format. The leading end of a pack includes a pack header area which comprises a pack_start_code area, an SCR area, and a mux_rate area. The pack header is followed, in order, by a video_packet_header area and a video data area for storing video data which does not contain an I-picture. An entry_packet area is located adjacent the video data area. Following the entry_packet area is, in order, a video_packet_header area and a video data area for storing video data which does contain an I-picture. As shown, adjacent the video data area is an audio_packet_header area followed by an audio data area.

Figure 3:
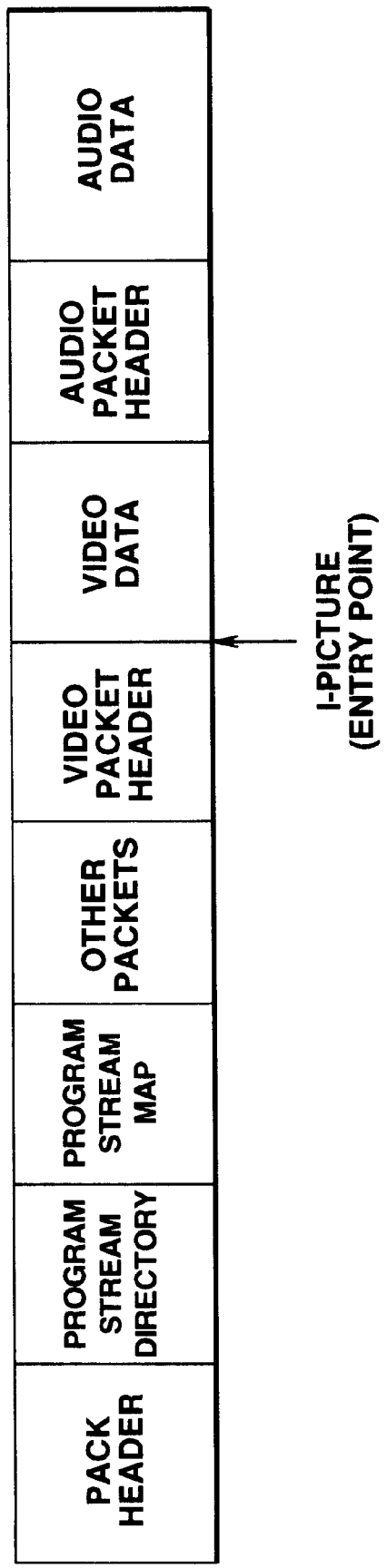
FIG. 3 is a format diagram for an entry sector entry__packet area.

FIG. 3 illustrates a preferred format for an entry sector entry_packet area. The entry sector begins with a pack_header area which includes a pack_start_code area, an SCR area, and a mux_rate area. The pack_header is followed, in order, by a program_stream_directory area and a program_stream_map area. After the program_stream_map area, an area for "other" packets is provided in which it is preferred that data other than a video packet is recorded. Adjacent the "other" packets area is a video_packet_header area and a video data area for storing video data which does contain an I-picture. The predetermined sequence of the information described above facilitates processing of the information.

The MPEG2 system standard defines a preferred structure for the program_stream_directory area as illustrated in FIG. 4. The program_stream_directory area stores information indicating the accessible positions in a stream. According to the processing steps indicated by reference letter A in FIG. 4, where number_of_access units equal 7, position information may be stored regarding seven intra-coded pictures (I-pictures), e.g. three before (forward), one current (immediately behind), and three after (backward).

FIG. 5 illustrates a preferred format for a program_stream_map area. According to the processing steps indicated by reference letters B and C in FIG. 5, various types of information may be stored in descriptor( ) areas. A sampling of descriptor information which may be stored is illustrated in FIG. 6. Also, FIG. 7 illustrates a format for a stream_grouping_descriptor area which may be included in the descriptor( ) area designated by reference letter B. The num_of_groups area stores information regarding the number of groups in an elementary stream which are defined as having the same or same type of contents. The num_of_streams_in_groups area stores information regarding the total number of elementary streams in the group. FIG. 8 illustrates a preferred format for a stream_type area which may be included in a descriptor( ) area. The stream_type area stores definition information regarding the elementary stream types.

With reference to FIG. 7, a stream_id area stores definition information regarding an elementary stream forming part of a particular group. The num_language_channels_in_groups area stores information regarding the number of language channels of a multi-channel audio stream in a particular group. The language_channel area, which may be included in a descriptor area, stores definition information regarding the number of language channels and forms a series of group language channels generated in the bitstream and beginning from zero. The padding area, which may be included in a descriptor area, stores a padding bit to be inserted in a descriptor area to maintain the length of the descriptor information.

Figure 9:
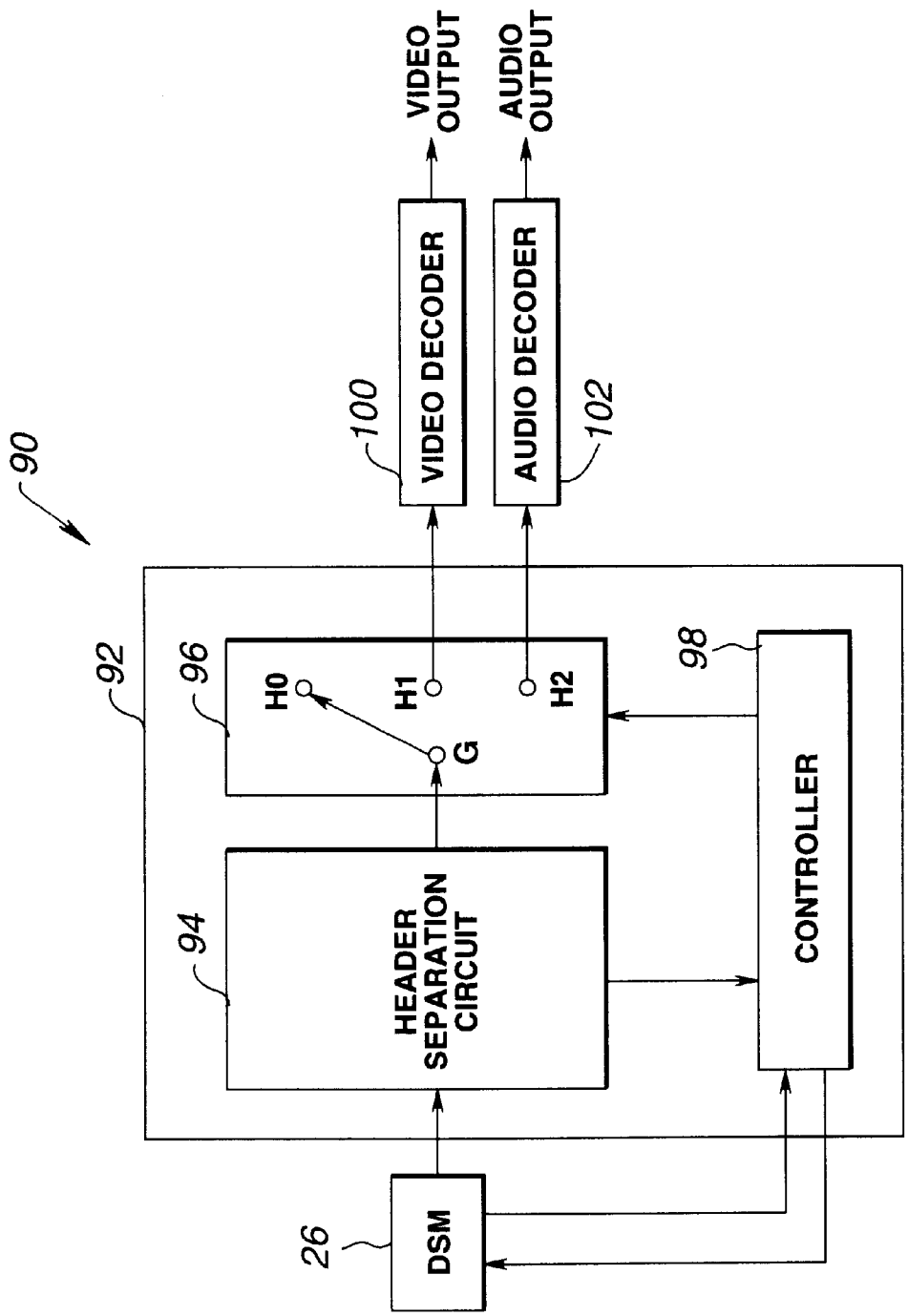
FIG. 9 is a block diagram of a decoding apparatus.

FIG. 9 illustrates a data decoding apparatus 90 according to an embodiment of the present invention. Decoding apparatus 90 retrieves data from storage medium 26, demultiplexes the data, and separately decodes the video data and the audio data. Data in storage medium 26 has been recorded in accordance with above description of the operation of data encoding apparatus 10.

Decoding apparatus 90 includes a separation device 92, a video decoder 100, and an audio decoder 102. Separation device 92 includes a header separation circuit 94, a switching circuit 96, and a controller 98.

Output terminal H1 of switching circuit 96 is coupled to an input of video decoder 100 and output terminal H2 is coupled to an input of audio decoder 102.

In operation, storage medium 26 supplies multiplexed data to header separation circuit 94 and reproduction position information to controller 98. Circuit 94 separates pack header information, sector header information, and entry sector information from the multiplexed data and routes the three types of information to controller 98. The remainder of the multiplexed data is supplied to input terminal G of switching circuit 96.

Controller 98 retrieves from the information supplied by header separation circuit 94 information regarding an entry point. The entry point information is stored in an entry point storage unit (not shown) along with position information received from storage medium 26. In accordance with stream_id information included in the sector header information supplied by header separation circuit 94, controller 98 controls switching circuit 96 to sequentially coupled input terminal G with output terminals H1 and H2, thereby routing encoded video data to video decoder 100 and encoded audio data to audio decoder 102.

In this manner, controller 98 controls the decoding operation such that when audio decoder 102 is not adapted for decoding linear PCM audio signals originally encoded from an elementary stream of audio input signals AU1, an elementary stream of audio input signals AU2, belonging to a same group as input signals AU1, is sought to allow audio decoder 102 to decode audio input signals AU2.

Although illustrative embodiments of the present invention and modifications thereof have been described in detail herein, it is to be understood that this invention is not limited to these precise embodiments and modifications, and that other modifications and variations may be effected therein by one skilled in the art without departing from the scope and spirit of the invention as defined by the appended claims.

What is claimed is:

1. A data encoding apparatus comprising:
    receiving means for receiving a plurality of multi-channel audio data each encoded according to a different encoding method;
    group information generating means for generating a group information identifying each of said plurality of multi-channel audio data as belonging to a particular group, said group information comprising information defining a kind of a group and a type of said audio data and indicating that the type of contents of said audio data in the respective group is similar; and
    multiplexing means for multiplexing said plurality of multi-channel audio data with said group information to produce a multiplexed data.

2. The apparatus according to claim 1 further comprising header appending means for appending said group information to said plurality of multi-channel audio data.

3. The apparatus according to claim 1 further comprising recording means for recording said multiplexed data on a storage medium.

4. The apparatus according to claim 1 wherein said plurality of multi-channel audio data comprises a plurality of data of a same elementary stream type.

5. The apparatus according to claim 1 wherein said plurality of multi-channel audio data comprises a plurality of same data.

6. The apparatus according to claim 1 wherein said different encoding method comprises a linear PCM coding.

7. The apparatus according to claim 1 wherein said different encoding method comprises a MPEG coding.

8. The apparatus according to claim 1 wherein said group information comprises a program_stream_map information.

9. The apparatus according to claim 1 wherein said group information comprises a stream_grouping_descriptor information.

10. The apparatus according to claim 1 wherein said group information comprises a stream_type information.

11. A method of data encoding comprising the steps of:
    receiving a plurality of multi-channel audio data as belonging to a particular group, said group information comprising information defining a kind of a group and a type of said audio data and indicating that the type of contents of said audio data in the respective group is similar; and multiplexing said plurality of multi-channel audio data with said group information to produce a multiplexed data.

12. The method according to claim 11 further comprising the step of appending said group information to said plurality of multi-channel audio data.

13. The method according to claim 11 further comprising the step of recording said multiplexed data on a storage medium.

14. The method according to claim 11 wherein said plurality of multi-channel audio data comprises a plurality of data of a same elementary stream type.

15. The method according to claim 11 wherein said plurality of multi-channel audio data comprises a plurality of same data.

16. The method according to claim 11 wherein said different encoding method comprises a linear PCM coding.

17. The method according to claim 11 wherein said different encoding method comprises a MPEG coding.

18. The method according to claim 11 wherein said group information comprises a program_stream_map information.

19. The method according to claim 11 wherein said group information comprises a stream_grouping_descriptor information.

20. The method according to claim 11 wherein said group information comprises a stream_type information.

21. A recording medium for use in conjunction with a processor-controlled apparatus and having a plurality of coded audio data recorded thereupon and having a group information recorded thereupon, said group information comprising information identifying each of said plurality of coded audio data as belonging to a particular group and a type of said audio data and indicating that the type of contents of said audio data in the respective group is similar, thereby enabling the processor-controlled apparatus to reproduce from the recording medium a plurality of group data by using the group information to select said group data from said plurality of coded audio data.

22. A decoding apparatus comprising:
receiving means for receiving a multiplexed data comprised of a plurality of multi-channel audio data each encoded according to a different encoding method and of a group information data identifying each of said plurality of multi-channel audio data as belonging to a particular group, said group information comprising information defining a kind of a group and a type of said audio data and indicating that the type of contents of said audio data in the respective group is similar;
group information detection means for detecting said group information; and
demultiplexing means, coupled to said group information detection means, for demultiplexing said multiplexed data to isolate said plurality of multi-channel audio data belonging to said particular group.

23. The apparatus according to claim 22 further comprising decoding means for decoding said plurality of multi-channel audio data.

24. The apparatus according to claim 22 wherein said demultiplexing means demultiplexes said multiplexed data as a function of said group information.

25. The apparatus according to claim 22 further comprising header separating means for separating said group information from said plurality of multi-channel audio data.

26. The apparatus according to claim 22 wherein said plurality of multi-channel audio data comprises a plurality of data of a same elementary stream type.

27. The apparatus according to claim 22 wherein said plurality of multi-channel audio data comprises a plurality of same data.

28. The apparatus according to claim 22 wherein said different encoding method comprises a linear PCM coding.

29. The apparatus according to claim 22 wherein said different encoding method comprises a MPEG coding.

30. The apparatus according to claim 22 wherein said group information comprises a program_stream_map information.

31. The apparatus according to claim 22 wherein said group information comprises a stream_grouping_descriptor information.

32. The apparatus according to claim 22 wherein said group information comprises a stream_type information.

33. A method of decoding comprising the steps of:
receiving a multiplexed data comprised of a plurality of multi-channel audio data each encoded according to a different encoding method and of a group information data identifying each of said plurality of multi-channel audio data as belonging to a particular group, said group information comprising information defining a kind of a group and a type of said audio data and indicating that the type of contents of said audio data in the respective group is similar;
detecting said group information; and
demultiplexing said multiplexed data to isolate said multi-channel audio data belonging to said particular group.

34. The method according to claim 33 further comprising the step of decoding said plurality of multi-channel audio data.

35. The method according to claim 33 wherein the step of demultiplexing comprises the step of demultiplexing said multiplexed data as a function of said group information.

36. The method according to claim 33 further comprising the step of separating said group information from said plurality of multi-channel audio data.

37. The method according to claim 33 wherein said plurality of multi-channel audio data comprises a plurality of data of a same elementary stream type.

38. The method according to claim 33 wherein said plurality of multi-channel audio data comprises a plurality of same data.

39. The method according to claim 33 wherein said different encoding method comprises a linear PCM coding.

40. The method according to claim 33 wherein said different encoding method comprises a MPEG coding.

41. The method according to claim 33 wherein said group information comprises a program_stream_map information.

42. The method according to claim 33 wherein said group information comprises a stream_grouping_descriptor information.

43. The method according to claim 33 wherein said group information comprises a stream_type information.

* * * * *